(12) United States Patent
Sokolov et al.

(10) Patent No.: US 10,148,631 B1
(45) Date of Patent: Dec. 4, 2018

(54) SYSTEMS AND METHODS FOR PREVENTING SESSION HIJACKING

(71) Applicant: Symantec Corporation, Mountain View, CA (US)

(72) Inventors: Ilya Sokolov, Boston, MA (US); Kevin Jiang, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 87 days.

(21) Appl. No.: 14/869,324

(22) Filed: Sep. 29, 2015

(51) Int. Cl.
| H04L 29/06 | (2006.01) |
| G06F 21/31 | (2013.01) |
| H04L 29/08 | (2006.01) |
| H04W 12/06 | (2009.01) |

(52) U.S. Cl.
CPC .............. *H04L 63/08* (2013.01); *G06F 21/31* (2013.01); *G06F 21/316* (2013.01); *H04L 63/0815* (2013.01); *H04L 63/105* (2013.01); *H04L 67/14* (2013.01); *H04W 12/06* (2013.01)

(58) Field of Classification Search
CPC ... H04L 63/08; H04L 63/0815; H04L 63/105; H04W 12/06; G06F 21/316; G06F 21/31
See application file for complete search history.

(56) References Cited

U.S. PATENT DOCUMENTS

| 8,285,648 B2 * | 10/2012 | Goodin | G06Q 20/02 705/44 |
| 8,925,058 B1 * | 12/2014 | Dotan | G06F 21/31 713/186 |
| 9,021,565 B2 * | 4/2015 | Novack | H04L 9/3231 713/186 |
| 9,094,388 B2 * | 7/2015 | Tkachev | H04L 63/08 |
| 9,119,539 B1 * | 9/2015 | Dotan | A61B 5/02438 |
| 9,130,929 B2 * | 9/2015 | Dorfman | H04L 63/0823 |

(Continued)

OTHER PUBLICATIONS

Aaraj, Najwa, et al. "Architectures for efficient face authentication in embedded systems." Proceedings of the conference on Design, automation and test in Europe: Designers' forum. European Design and Automation Association, 2006. (pp. 1-6).*

(Continued)

*Primary Examiner* — Kari L Schmidt
(74) *Attorney, Agent, or Firm* — Fisher Broyles, LLP (57) ABSTRACT

The disclosed computer-implemented method for preventing session hijacking may include (1) determining that a user is attempting to complete at least a portion of an authentication session on a first computing system, (2) using input from one or more input devices of the first computing system to obtain environmental context associated with the user's attempt to complete the authentication session, (3) preventing the authentication session from authenticating the user while using the environmental context to determine whether the authentication session is valid, where using the environmental context to determine whether the authentication session is valid includes (a) transmitting the environmental context to a second computing system and (b) requesting an indication of whether, based on an evaluation of the environmental context at the second computing system, the authentication session is valid. Various other methods, systems, and computer-readable media are also disclosed.

20 Claims, 5 Drawing Sheets

(56) References Cited

U.S. PATENT DOCUMENTS

| | | | | |
|---|---|---|---|---|
| 9,264,419 | B1* | 2/2016 | Johansson | H04L 63/08 |
| 9,438,597 | B1* | 9/2016 | Taylor | H04L 63/10 |
| 2005/0076198 | A1* | 4/2005 | Skomra | H04L 9/321 |
| | | | | 713/156 |
| 2007/0101409 | A1* | 5/2007 | Palekar | G06F 21/31 |
| | | | | 726/4 |
| 2008/0141313 | A1* | 6/2008 | Kato | H04N 7/1675 |
| | | | | 725/62 |
| 2009/0119754 | A1* | 5/2009 | Schubert | H04L 63/0853 |
| | | | | 726/4 |
| 2011/0189981 | A1* | 8/2011 | Faith | G06F 1/1694 |
| | | | | 455/414.1 |
| 2011/0219427 | A1* | 9/2011 | Hito | G06F 21/00 |
| | | | | 726/3 |
| 2013/0138388 | A1* | 5/2013 | Jain | G01P 15/00 |
| | | | | 702/141 |
| 2014/0259129 | A1* | 9/2014 | Copsey | G06F 21/40 |
| | | | | 726/5 |
| 2015/0128240 | A1* | 5/2015 | Richards | H04L 63/0861 |
| | | | | 726/7 |
| 2015/0294313 | A1* | 10/2015 | Kamal | G06Q 20/401 |
| | | | | 705/44 |
| 2015/0302571 | A1* | 10/2015 | Lambert | G06F 17/30259 |
| | | | | 382/115 |
| 2016/0021117 | A1* | 1/2016 | Harmon | H04L 63/105 |
| | | | | 726/1 |
| 2016/0180696 | A1* | 6/2016 | Janardhanan | G08B 25/008 |
| | | | | 340/501 |

OTHER PUBLICATIONS

Q. Tao and R. Veldhuis, "Biometric Authentication System on Mobile Personal Devices," in IEEE Transactions on Instrumentation and Measurement, vol. 59, No. 4, pp. 763-773, Apr. 2010.*

D. Crouse, H. Han, D. Chandra, B. Barbello and A. K. Jain, "Continuous authentication of mobile user: Fusion of face image and inertial Measurement Unit data," 2015 International Conference on Biometrics (ICB), Phuket, 2015, pp. 135-142.*

Rao, T. Venkat Narayana, and K. Vedavathi. "Authentication using mobile phone as a security token." IJCSET 1.9 (2011): 569-574.*

Kevin Jiang, et al.; Systems and Methods for Registering User Accounts with Multi-Factor Authentication Schemes Used by Online Services; U.S. Appl. No. 14/848,958, filed Sep. 9, 2015.

Law, Teresa, "VIP Push now available with Symantec Identity: Access Manager", http://www.symantec.com/connect/blogs/vip-push-now-available-symantec-identity-access-manager, as accessed Sep. 2, 2015, Symantec Connect, (Jan. 26, 2015).

"Saaspass", https://www.saaspass.com/technologies/proximity-instant-login-two-factor-authentication-beacon.html, as accessed Sep. 2, 2015, (on or before Sep. 2, 2015).

"Phishing", https://en.wikipedia.org/wiki/Phishing#Augmenting_password_logins, as accessed Sep. 2, 2015, Wikipedia, (Apr. 7, 2004).

Singh, Ashutosh K., et al., "Peer to Peer Secure Communication in Mobile Environment: A Novel Approach", http://research.ijcaonline.org/volume52/number9/pxc3881316.pdf, as accessed Sep. 2, 2015, International Journal of Computer Applications (0975-8887), vol. 52—No. 9, (Aug. 2012), pp. 24-29.

* cited by examiner

SYSTEMS AND METHODS FOR PREVENTING SESSION HIJACKING

BACKGROUND

Virtually all computer users have experienced the process of authenticating to a device, program, or web page using a user name and password. In response to various types of attacks, information security specialists have devised a variety of improvements or replacements to this process. For example, in a phishing attack a user may be presented with a fake login page. The attacker obtains users' credentials when they enter them into the fake login page. To subvert this type of attack, when a user account is created, the user may be asked to select an image that will be used to identify a genuine login page. During the authentication process, the user may be asked for a user name, and then shown the selected image before being asked to enter a password. This approach may thwart most attacks of this type, since the attacker is unlikely to know which image to display for a user.

Another refinement to the authentication process is known as "multi-factor authentication," in which users may be asked to provide one or more additional authentication tokens besides a password. Multi-factor authentication systems may require users to possess a magnetic card or electronic device, answer challenge questions, or submit to biometric scanning.

Several enhancements to the authentication process involve the use of a personal device, such as a mobile phone or tablet computer. During creation of a user account, the user may be asked to identify a personal device that is expected to remain in the user's possession. When authenticating on another device, the user may be asked to endorse the authentication attempt on the personal device. For example, when authenticating to a social media account on a computer, the social media service may send an SMS message to the user's mobile phone, asking them to verify that the user is attempting to log into the service by replying to the message or by clicking on a button or link.

Unfortunately, these enhancements to the authentication process are subject to an attack known as "session hijacking." By monitoring a user's activities, an attacker may time an attack to coincide with an authentication attempt by the user. The user may mistakenly endorse the attacker's authentication attempt either because the attacker's endorsement request arrived at the user's personal device first, or because the user assumed a system error resulted in a second endorsement request being sent. Accordingly, what is needed are additional and improved systems and methods for preventing session hijacking.

SUMMARY

As will be described in greater detail below, the instant disclosure describes various systems and methods for preventing session hijacking by using input from one or more input devices on a computing system on which a user is attempting to authenticate to obtain environmental context data that may uniquely identify the user and/or the context in which they are attempting to authenticate. The environmental context data may then be transmitted to a second computing system, where the data may be evaluated and the authentication attempt validated or denied. Evaluation of the environmental context may include computer-implemented processes and/or requesting indication from the user (or other authority) on a device in the user's possession that the authentication session is valid.

In one example, a computer-implemented method for preventing session hijacking may include (1) determining that a user is attempting to complete at least a portion of an authentication session on a first computing system, (2) using input from one or more input devices of the first computing system to obtain environmental context associated with the user's attempt to complete the authentication session, (3) preventing the authentication session from authenticating the user while using the environmental context to determine whether the authentication session is valid, where using the environmental context to determine whether the authentication session is valid includes (a) transmitting the environmental context to a second computing system and (b) requesting an indication of whether, based on an evaluation of the environmental context at the second computing system, the authentication session is valid.

In some examples, requesting the indication of whether the authentication session is valid may include displaying an input request on a device in the possession of an identification authority for the authentication session. In one embodiment, the indication of whether the authentication session is valid indicates that the authentication session is valid and the computer-implemented method may further include allowing the authentication session to authenticate the user. In one embodiment, the indication of whether the authentication session is valid indicates that the authentication session is not valid and the computer-implemented method may further include (1) determining, based on the indication that the authentication session is not valid, that a session hijacking attempt is likely in progress and (2) based on the determination that a session hijacking attempt is likely in progress, performing a security action.

In one embodiment, the security action may include (1) notifying an administrator of the session hijacking attempt, (2) notifying the user of the session hijacking attempt, (3) requesting, from the user, one or more additional authentication factors, and/or (4) denying authentication of the user for the authentication session. In one embodiment, the computer-implemented method may further include (1) before requesting the indication of whether the authentication session is valid, performing a computer-implemented analysis of the environmental context to obtain evidence of whether the authentication session is valid and (2) including the results of the analysis of the environmental context in the request for the indication of whether the authentication session is valid. In one embodiment, the input device may include: (1) a still image camera, (2) a video camera, (3) a microphone, (4) an accelerometer, (5) a global positioning system (GPS) device, and (6) a computing system display capture device.

In one embodiment, a system for implementing the above-described method may include several modules stored in memory, such as (1) an authentication module that determines that a user is attempting to complete at least a portion of an authentication session on a first computing system, (2) a context module that uses input from one or more input devices of the first computing system to obtain environmental context associated with the user's attempt to complete the authentication session, (3) a verification module that prevents the authentication session from authenticating the user while using the environmental context to determine whether the authentication session is valid, (4) a communication module that transmits the environmental context to a second computing system, and (5) a validation module that requests an indication of whether, based on an evaluation of the environmental context at the second computing system, the authentication session is valid. The system may also include at least one physical processor configured to execute the authentication module, the context module, the verification module, the communication module, and the validation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a user is attempting to complete at least a portion of an authentication session on a first computing system, (2) use input from one or more input devices of the first computing system to obtain environmental context associated with the user's attempt to complete the authentication session, and (3) prevent the authentication session from authenticating the user while using the environmental context to determine whether the authentication session is valid, where using the environmental context to determine whether the authentication session is valid includes (a) transmitting the environmental context to a second computing system and (b) requesting an indication of whether, based on an evaluation of the environmental context at the second computing system, the authentication session is valid.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing session hijacking. As will be explained in greater detail below, systems and methods described herein may determine whether a session hijacking attack is likely in progress by obtaining input from one or more devices attached to a computing system to obtain environmental context associated with an authentication session. Systems and methods described herein may prevent the authentication session from authenticating the user unless and until an evaluation of the environmental context at a second computing system indicates that the authentication session is valid. By obtaining and evaluating environmental context associated with an authentication session, systems and methods described herein may determine whether an authentication session is valid or if it represents a likely session hijacking attack.

Figure 1:
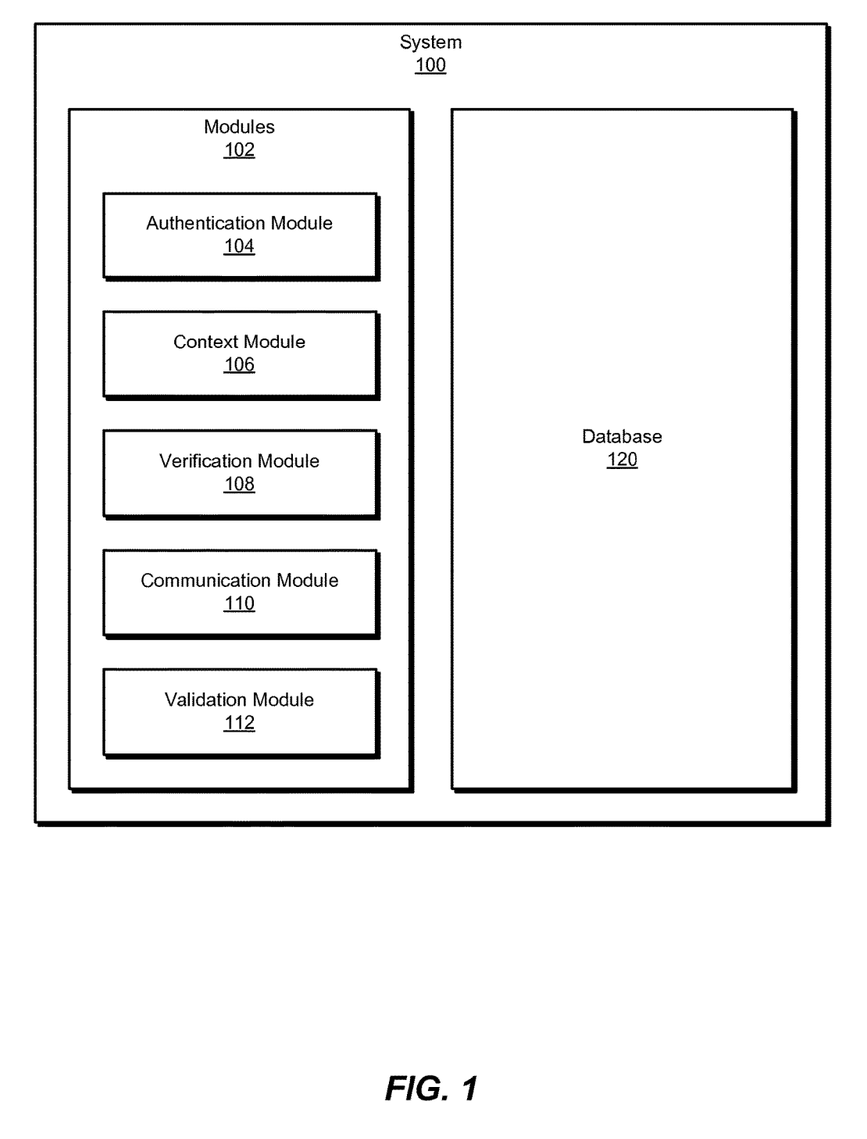
FIG. 1 is a block diagram of an exemplary system for preventing session hijacking.
Figure 2:
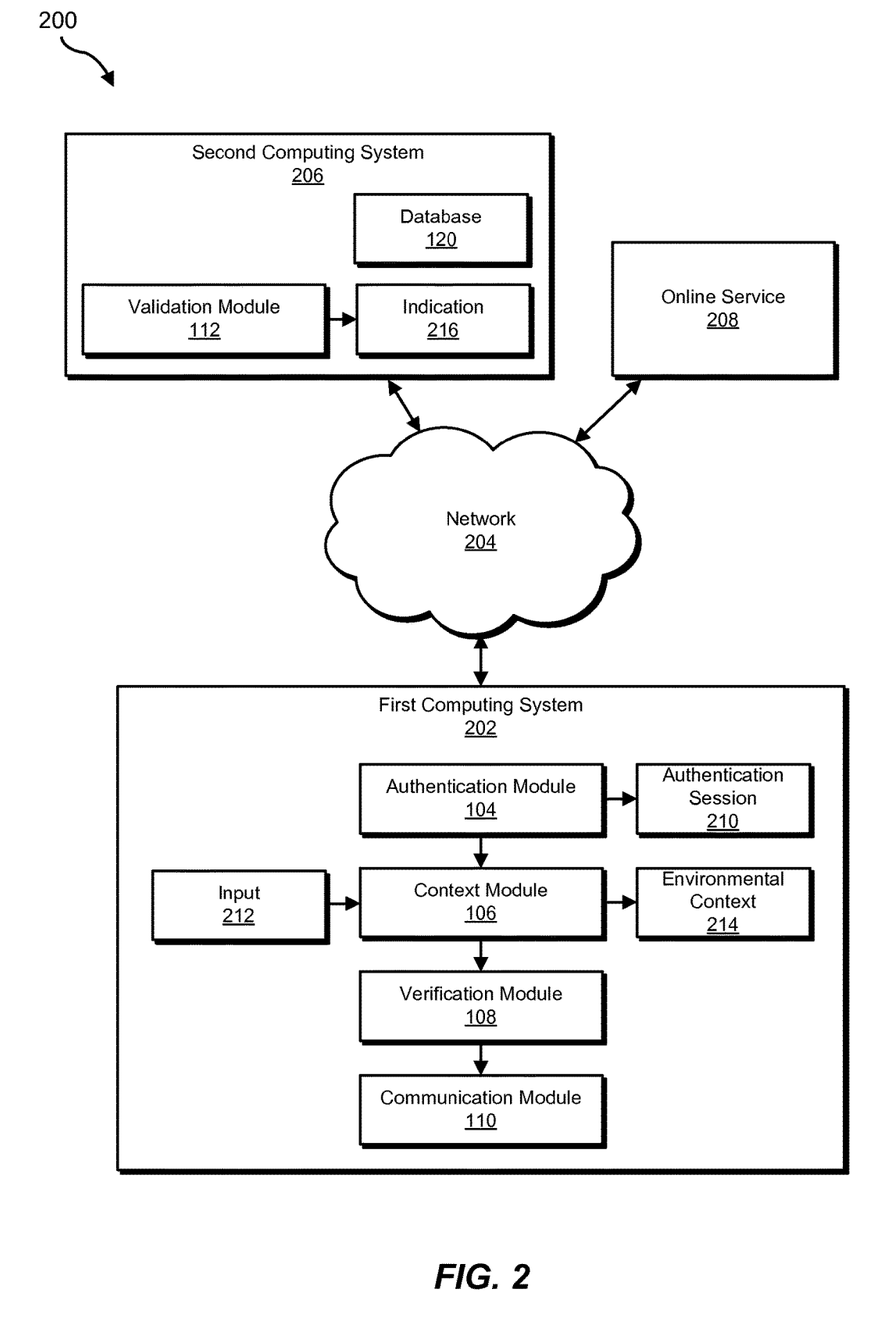
FIG. 2 is a block diagram of an additional exemplary system for preventing session hijacking.

The following will provide, with reference to FIGS. 1 and 2 detailed descriptions of exemplary systems for preventing session hijacking. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for preventing session hijacking. As illustrated in this figure, exemplary system 100 may include one or more modules 102 for performing one or more tasks. For example, and as will be explained in greater detail below, exemplary system 100 may include an authentication module 104 that determines that a user is attempting to complete at least a portion of an authentication session on a first computing system. Exemplary system 100 may additionally include a context module 106 that uses input from one or more input devices of the first computing system to obtain environmental context associated with the user's attempt to complete the authentication session. Exemplary system 100 may also include a verification module 108 that prevents the authentication session from authenticating the user while using the environmental context to determine whether the authentication session is valid. Exemplary system 100 may additionally include a communication module 110 that transmits the environmental context to a second computing system. Exemplary system 100 may also include a validation module 112 that requests an indication of whether, based on an evaluation of the environmental context at the second computing system, the authentication session is valid. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., first computing system 202, and/or second computing system 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store user account information, passwords, and/or other authentication data. Database 120 may represent portions of a single database or computing device or a plurality of databases or computing devices. For example, database 120 may represent a portion of second computing system 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as second computing system 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a first computing system 202 (such as a desktop or laptop computer) on which a user may be attempting to authenticate to an online service 208. First computing system 202 may be in communication with a second computing system 206 (that may be a mobile phone or tablet computer) that may validate the authentication process. Second computing system 206 may be part of online service 208 or second computing system 206 may be an independent service or computing system. The connection between first computing system 202, second computing system 206, and/or online service 208 may be via a network 204. In one example, first computing system 202 may be programmed with one or more of modules 102 and/or may store all or a portion of the data in database 120. Additionally or alternatively, second computing system 206 may be programmed with one or more of modules 102 and/or may store all or a portion of the data in database 120.

In one embodiment, one or more of modules 102 from FIG. 1 may, when executed by at least one processor of first computing system 202, and/or second computing system 206, enable first computing system 202, and/or second computing system 206 to prevent session hijacking. For example, and as will be described in greater detail below, authentication module 104 may determine that a user is attempting to complete at least a portion of an authentication session 210 on a first computing system 202. Context module 106 may use input 212 from one or more input devices of first computing system 202 to obtain environmental context 214 associated with the user's attempt to complete authentication session 210. Verification module 108 may prevent authentication session 210 from authenticating the user while using environmental context 214 to determine whether authentication session 210 is valid. Communication module 110 may transmit environmental context 214 to a second computing system 206. Validation module 112 may request an indication 216 of whether, based on an evaluation of environmental context 214 at second computing system 206, authentication session 210 is valid.

First computing system 202 and second computing system 206 generally represent any type or form of computing device capable of reading computer-executable instructions. Examples of first computing system 202 and second computing device 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Additionally, second computing system 206 may represent any type or form of computing device that is capable of receiving, storing, and comparing data. Examples of second computing system 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between first computing system 202 and second computing system 206.

Figure 3:
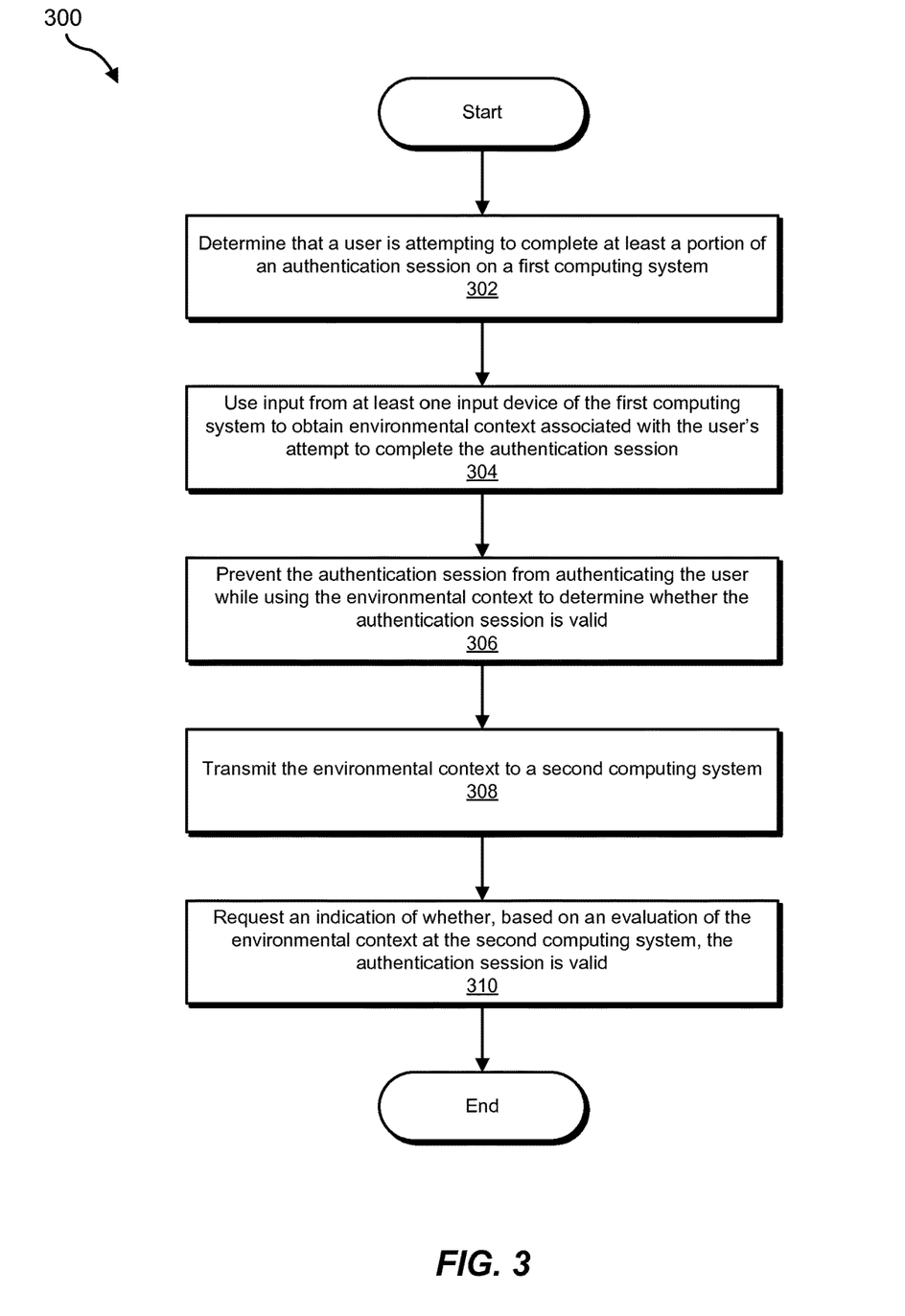
FIG. 3 is a flow diagram of an exemplary method for preventing session hijacking.

FIG. 3 is a flow diagram of an exemplary computer-implemented method 300 for preventing session hijacking. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302, one or more of the systems described herein may determine that a user is attempting to complete at least a portion of an authentication session on a first computing system. For example, authentication module 104 may, as part of first computing system 202 in FIG. 2, determine that a user is attempting to complete at least a portion of authentication session 210 on first computing system 202.

The term "authentication session," as used herein, generally refers to a process in which a user establishes his or her identity by providing credentials, such as a user name, password, magnetic card, electronic card, answers to challenge questions, biometrics, etc. As used herein, the term "authentication device" generally refers to a device that obtains authentication credentials from the user. As illustrated in FIG. 2, first computing system 202 may serve as an authentication device in system 200. Authentication credentials may be evaluated by the authentication device or transmitted to another computing system for processing. For example, first computing system 202 may obtain authentication credentials from the user and transmit them to second computing system 206 for evaluation. An authentication session ends when the user is either authenticated and granted access to resources (such as data, devices, storage, programs, etc.) or authentication is denied.

Authentication module 104 may determine that a user is attempting to authenticate to an online service, such as online service 208 in FIG. 2. The term "online service," as used herein, generally refers to any website and/or service that is provided via the Internet. Examples of an online service may include, without limitation, a social networking platform, an e-mail service, a chat service, a forum, a retail website, an online game, and/or financial website. In some embodiments, an online service may enable users to create personal accounts within the online service that store private and/or sensitive information associated with the user. The terms "account" and "user account," as used herein, generally refer to any representation of a user to one or more online services.

Authentication module 104 may determine that a user is attempting to complete an authentication session in a variety of ways. For example, authentication module 104 may be part of a security subsystem of a computer operating system, or connect to a security subsystem via an application programming interface (API) or event handling routine. In another example, authentication module 104 may be part of an authentication process of an application or web service.

At step 304, one or more of the systems described herein may use input from one or more input devices of the first computing system to obtain environmental context associated with the user's attempt to complete the authentication session. For example, context module 106 may, as part of first computing system 202 in FIG. 2, use input 212 from one or more input devices of first computing system 202 to obtain environmental context 214 associated with the user's attempt to complete authentication session 210.

The term "environmental context," as used herein, generally refers to environmental data related to an authentication session that may be used in conjunction with authentication credentials to determine whether an authentication attempt by a user is valid. Environmental context may provide audio or video context about the environment surrounding a user attempting to complete an authentication process. Additionally or alternatively, environmental context may include screenshots, information about user input patterns, geolocation information, device movement information, and/or any other type of contextual data.

Context module 106 may use input from one or more input devices to obtain a variety of types of data that may be included in the environmental context for an authentication session. Examples of environmental context data may include, without limitation (1) a still image of a user attempting to authenticate to an authentication device, captured by a still image camera, (2) a video image of a user, captured by a video camera, (3) audio data, such as the voice of an authenticating user, recorded from a microphone, (4) device position or movement data, obtained from one or more accelerometers, (5) location data from a global positioning system device, and/or (6) an image showing the state of a computing system display, captured by a computing system display capture device. Environmental context for an authentication session may combine data from several devices. For example, an authentication device without a camera may present a user attempting to authenticate with a randomly selected series of words to read into a microphone. The environmental context for the authentication session may include a screen capture from the authentication device that includes the series of words, along with a recording of the user reading the words.

At step 306, one or more of the systems described herein may prevent the authentication session from authenticating the user while using the environmental context to determine whether the authentication session is valid. For example, verification module 108 may, as part of first computing system 202 in FIG. 2, prevent authentication session 210 from authenticating the user while using environmental context 214 to determine whether authentication session 210 is valid. For example, an authentication device with a camera may capture a still image or a video image of a user who initiated an authentication session. The image or video may then be transmitted to the user's mobile phone, where the user may view the image or video and verify that the authentication session is valid and not part of a session hijacking attack.

Environmental context may be related to or separate from authentication credentials. For example, an authentication system may use a user name and password as authentication credentials and separately capture an image of the authenticating user as environmental context to be validated by the user. In another example, an authentication system may capture an image of the authenticating user as well as a recording of the user's voice. The authentication system may then use biometric face scanning and voiceprint analysis to obtain authentication credentials, with the voice recording and image also transmitted to the user as environmental context data for validation. In this example, while the biometric or voice analysis may establish the user's identity, details of the environmental context, such as clothing worn by the user, lighting, background objects, ambient sounds, etc. may help the user verify that the environmental context data was captured by authentication devices during the authentication session, and not provided from recordings by a session hijacking attacker.

Verification module 108 may prevent the authentication session from authenticating the user in a variety of ways. For example, verification module 108, as part of the authentication subsystem of first computing system 202, may prevent first computing system 202 from authenticating the user until a response is received from a personal device in possession of the user verifying that the environmental context for authentication session 210 is valid. In another example, verification module 108 may execute on second computing system 206 as part of an authentication system for an application server or web server.

Verification module 108 may prevent authentication session 210 from authenticating the user until second computing system 206 has verified that environmental context 214 is valid for authentication session 210. In another example, verification module 108 may permit authentication session 210 to authenticate the user after a time period has elapsed, unless second computing system 206 has determined that environmental context 214 is not valid for authentication session 210. For example, in an authentication system where a high level of security is not required, verification module 108 may permit authentication session 210 to authenticate the user if a response is not received from second computing system 206 within 30 seconds indicating that environmental context 214 is not valid for authentication session 210. An authentication system that requires a higher level of security may require a user to evaluate and explicitly endorse or reject the environmental context before verification module 108 permits authentication session 210 to proceed.

Using environmental context 214 to validate authentication session 210 may include performing steps 308 and 310. At step 308, one or more of the systems described herein may transmit the environmental context to a second computing system. For example, communication module 110 may, as part of first computing system 202 in FIG. 2, transmit environmental context 214 to second computing system 206.

Communication module 110 may transmit environmental context 214 in a variety of ways. For example, second computing system 206 may be a web or application server. Communication module 110 may transmit environmental context 214 over a transport layer security/secure sockets layer (TLS/SSL) connection to the server.

At step 310, one or more of the systems described herein may request an indication of whether, based on an evaluation of the environmental context at the second computing system, the authentication session is valid. For example, validation module 112 may, as part of second computing system 206 in FIG. 2, request indication 216 of whether, based on an evaluation of environmental context 214 at second computing system 206, authentication session 210 is valid.

Validation module 112 may request indication of whether the authentication session is valid in a variety of ways. For example, validation module 112 may request the indication of whether the authentication session is valid by displaying an input request on a device in the possession of an identification authority for the authentication session. For example, validation module 112 may, as part of second computing system 206, request indication 216 of whether authentication session 210 is valid by displaying an input request on a device (not shown in FIG. 2) in possession of an identification authority for authentication session 210. In another example, the request for indication 216 may be included with environmental context 214 when communication module 110 transmits environmental context 214 to second computing system 206. In another example, the request for indication 216 that authentication session 210 is valid may be implied by transmission of environmental context 214.

The term "identification authority," as used herein, generally refers to a person or service designated to validate an environmental context for an authentication session. For example, an identification authority may be the user, who verifies that the environmental context is valid for his or her own authentication session. In another example, the identification authority may be an account owner for an account to which the user is attempting to authenticate. The identification authority may verify that the user is someone authorized to authenticate to the account and/or that details of the environmental context indicate that the authentication session is valid and not part of a session hijack attack. For example, an identification authority may verify that an image of the user shows a person known to the identification authority in a setting where an authorized authentication device is located, and that GPS data from the device confirms that the device is in the authorized location.

Additional examples of ways that environmental context data may be evaluated may include verifying, based on GPS data obtained from the authentication device, that the authentication device is located in a company office building, using accelerometer data to help validate image data by determining the position of a mobile device when an image was captured, or using screen capture data to verify that the authentication device display appears as expected.

When the indication of whether the authentication session is valid indicates that the authentication session is valid, the systems described herein may allow the authentication session to authenticate the user. For example, validation module 112 may, as part of second computing system 206 in FIG. 2, receive indication 216 indicating that environmental context 214 is valid for authentication session 210. For example, environmental context 214 may include an image of the user captured by a camera attached to first computing system 202 during authentication session 210. Validation module 112 may transmit the image to a device in possession of the user. The user may then view the image and verify that details of the image (such as clothing the user is wearing, lighting, objects in the background of the image, etc.) indicate that the image was captured during authentication session 210. The user may then click a button or otherwise activate a user interface element to transmit validation of authentication session 210 to validation module 112 on second computing system 206. Validation module 112 may then notify first computing system 202 that the user may be authenticated in authentication session 210.

When the indication of whether the authentication session is valid indicates that the authentication session is not valid, the systems described herein may determine, based on the indication that the authentication session is not valid, that a session hijacking attempt is likely in progress and perform a security action based on the determination that a session hijacking attempt is likely in progress. For example, validation module 112 may, as part of second computing system 206 in FIG. 2, receive indication 216 indicating that environmental context 214 is not valid for authentication session 210. As described above, the user may view an image transmitted by validation module 112 to a device in possession of the user and determine that the image shows that an unknown person is attempting to authenticate, and therefore that environmental context 214 is not valid for authentication session 210. In response, validation module 112 may then notify first computing system 202 that the user should not be authenticated in authentication session 210, and that a session hijacking attack is likely in progress. Validation module 112 may initiate a security action or direct first computing system 202 to initiate a security action.

In one embodiment, the security action may include one or more of (1) notifying an administrator of the session hijacking attempt, (2) notifying the user of the session hijacking attempt, (3) requesting, from the user, one or more additional authentication factors, and/or (4) denying authentication of the user for the authentication session. For example, validation module 112 may notify an administrator that an attempted session hijacking attack may be in progress for authentication session 210 on first computing system 202. In another example, validation module 112 may simply notify authentication module 104 that authentication should be denied for the user for authentication session 210. The user may then initiate another authentication session.

In one example, validation module 112 may initiate additional security actions in the case of repeated authentication failures. For example, if a first attempt at authentication fails due to a suspected session hijacking attempt, validation module 112 may simply deny authentication to the user. If a subsequent authentication attempt fails, validation module 112 may notify the user and an administrator that a session hijacking attack is likely in progress and take additional action, such as locking the user account or requiring the user to provide additional authentication factors before authentication is permitted.

In one embodiment, evaluating the environmental context at the second computing system may include performing a computer-implemented analysis of the environmental context before requesting the indication that the authentication session is valid. For example, validation module 112 may, as part of second computing system 206 in FIG. 2, perform a computer-implemented analysis of environmental context 214 to obtain evidence of whether authentication session 210 is valid and include results of the analysis when requesting indication 216 that authentication session 210 is valid. For example, validation module 112 may compare an image received during an authentication attempt to an image of the user stored on second computing system 206. If the two images appear to show two different people, validation module 112 may notify the user that environmental context 214 is suspect by displaying a warning message, vibrating the device, emitting a sound, etc. when presenting the image to the user (or other identification authority). The user may then confirm that the environmental context is not valid and that the authentication session should not be permitted to proceed or override the evaluation made at the second computing device and indicate that the authentication session is valid.

As described in greater detail above, systems and methods described herein may determine whether a session hijacking attack is likely in progress by obtaining and evaluating environmental context associated with an authentication session. An environmental context may include input from any of a variety of input devices of a computing system, such as a still camera, video camera, microphone, accelerometer, GPS device, or display capture device, etc. The data included in an environmental context may vary, depending on the input devices available on the authentication device, the desired level of security for the authentication session, and/or the needs or preferences of the authentication system implementer.

As discussed, evaluating an environmental context may combine the precision and objectivity of a computer-implemented analysis of the environmental context with the pattern recognition capabilities inherent in an examination of the environmental context by the user or other identification authority. Various configurations of the systems and methods described herein may be adapted for authentication to a single computing device or program, a cloud service, networked application, web service, etc.

Figure 4:
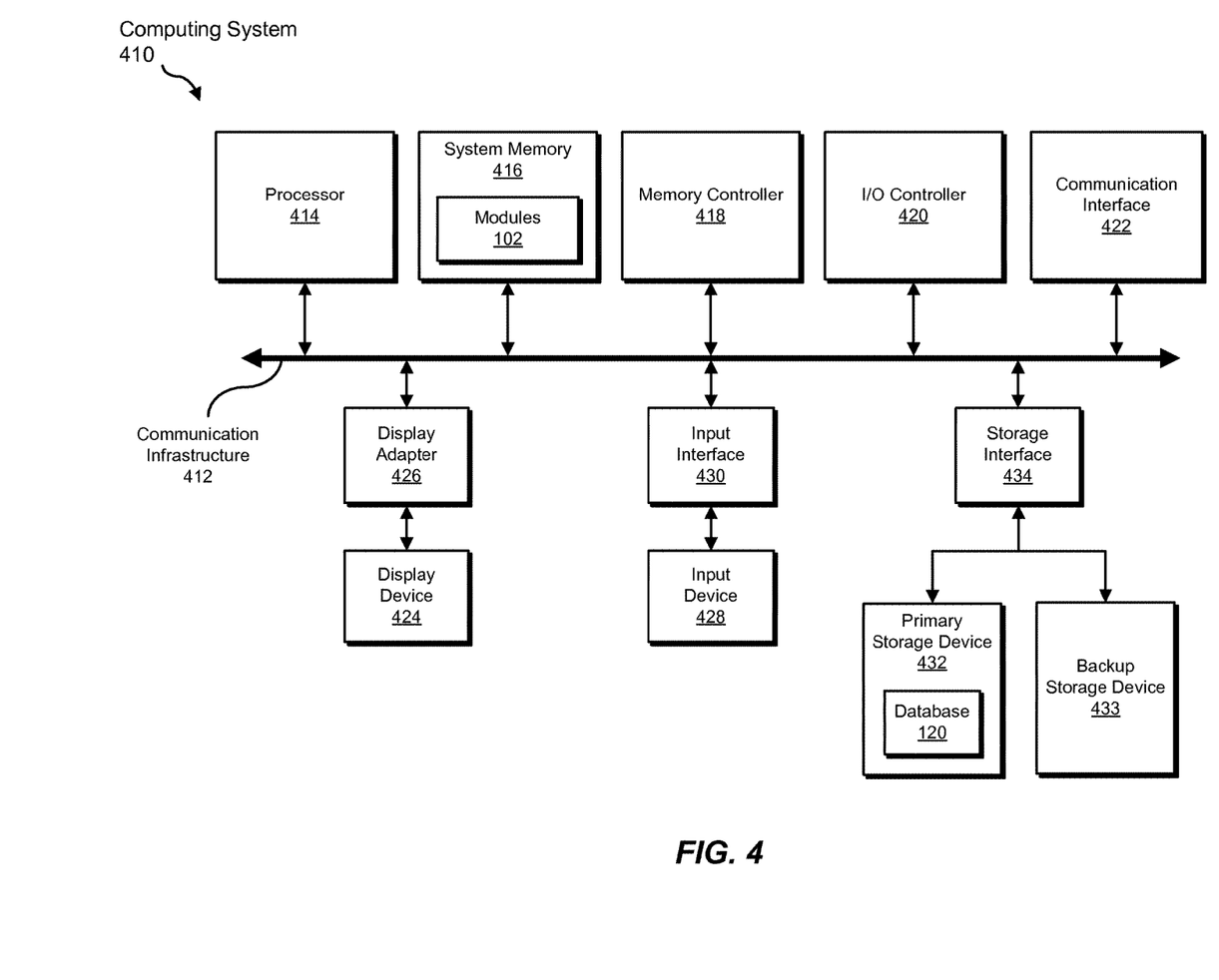
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
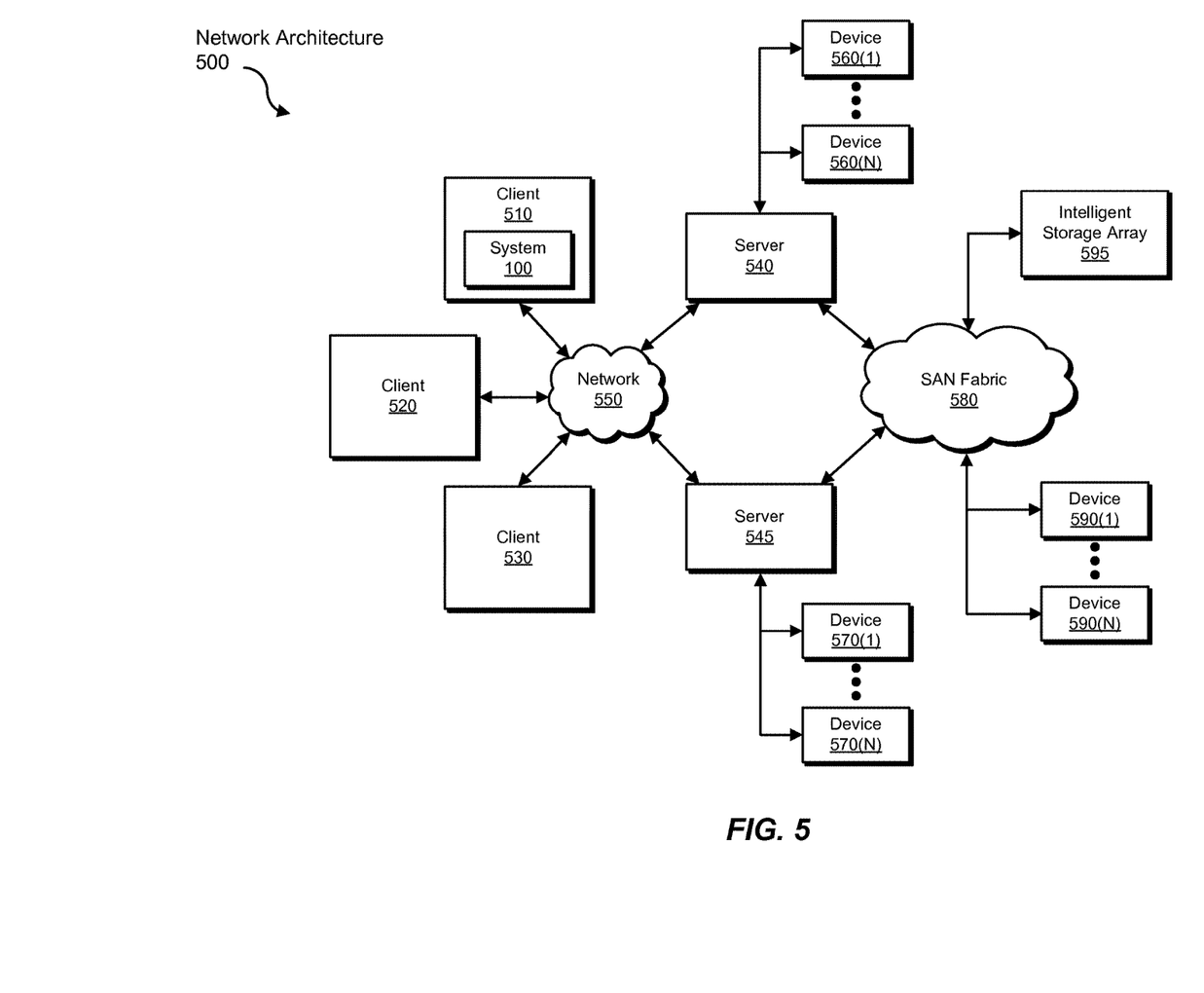
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for preventing session hijacking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive device input data to be transformed, transform the device input data, output a result of the transformation to obtain environmental context, use the result of the transformation to request indication that the environmental context is valid, and store the result of the transformation to validate authentication sessions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing session hijacking, at least a portion of the method being performed by a computing device comprising at least one processor, the method comprising:
   determining that a user is attempting to complete at least a portion of an authentication session on a first computing system;
   using input from at least one input device of the first computing system to obtain environmental context associated with the attempt by the user to complete the authentication session, the environmental context comprising at least one image of the user captured by a camera of the first computing system; and
   preventing the authentication session from authenticating the user while using the image of the user to determine whether the authentication session is valid, wherein using the image of the user to determine whether the authentication session is valid comprises:
   transmitting the image of the user to the user at a second computing system that comprises a mobile device of the user;
   the mobile device performing a computer-implemented analysis of the environmental context before requesting an indication that the authentication session is valid;
   the mobile device notifying the user that the environmental context is suspect by outputting a warning in response to determining that the image of the user shows a different person than a stored image of the user shows;
   requesting, from the mobile device of the user, the indication from the user of whether, based on an evaluation by the user of the image of the user, the authentication session is valid; and
   the mobile device notifying the first computing system that the user is allowed to be authenticated in the authentication session.

2. The computer-implemented method of claim 1, wherein requesting the indication from the user of whether the authentication session is valid comprises displaying an input request on the mobile device in possession of the user for the authentication session.

3. The computer-implemented method of claim 1:
   wherein the indication from the user of whether the authentication session is valid indicates that the authentication session is valid; and
   further comprising allowing the authentication session to authenticate the user.

4. The computer-implemented method of claim 1:
   wherein an additional indication from the user of whether the authentication session is valid indicates that the authentication session is not valid; and
   further comprising:
   determining, based on the additional indication from the user that the authentication session is not valid, that a session hijacking attempt is likely in progress; and
   based on the determination that the session hijacking attempt is likely in progress, performing a security action.

5. The computer-implemented method of claim 4, wherein the security action comprises at least one of:
  notifying an administrator of the session hijacking attempt;
  notifying the user of the session hijacking attempt;
  requesting, from the user, at least one additional authentication factor; and
  denying authentication of the user for the authentication session.

6. The computer-implemented method of claim 1, further comprising
  including results of the analysis of the environmental context in the request for the indication from the user of whether the authentication session is valid.

7. The computer-implemented method of claim 1, wherein the input device comprises at least one of:
  a still image camera; and
  a video camera.

8. A system for preventing session hijacking, the system comprising:
  an authentication module, stored in memory, that determines that a user is attempting to complete at least a portion of an authentication session on a first computing system;
  a context module, stored in memory, that uses input from at least one input device of the first computing system to obtain environmental context associated with the attempt by the user to complete the authentication session, the environmental context comprising at least one image of the user captured by a camera of the first computing system;
  a verification module, stored in memory, that prevents the authentication session from authenticating the user while using the image of the user to determine whether the authentication session is valid;
  a communication module, stored in memory, that transmits the image of the user to the user at a second computing system that comprises a mobile device of the user;
  a validation module, stored in memory, that:
    performs, as part of the mobile device, a computer-implemented analysis of the environmental context before requesting an indication that the authentication session is valid;
    notifies, as part of the mobile device, the user that the environmental context is suspect by outputting a warning in response to determining that the image of the user shows a different person than a stored image of the user shows;
    requests, from the mobile device of the user, the indication from the user of whether, based on an evaluation by the user of the image of the user, the authentication session is valid, and
    notifies, as part of the mobile device, the first computing system that the user is allowed to be authenticated in the authentication session; and
  at least one physical processor configured to execute the authentication module, the context module, the verification module, the communication module, and the validation module.

9. The system of claim 8, wherein the validation module requests the indication from the user of whether the authentication session is valid by displaying an input request on the mobile device in possession of the user for the authentication session.

10. The system of claim 8, wherein:
  the validation module receives the indication from the user of whether the authentication session is valid, which indicates that the authentication session is valid; and
  the verification module allows the authentication session to authenticate the user.

11. The system of claim 8, wherein the validation module:
  receives an additional indication from the user of whether the authentication session is valid, which indicates that the authentication session is not valid;
  determines, based on the additional indication from the user that the authentication session is not valid, that a session hijacking attempt is likely in progress; and
  based on the determination that the session hijacking attempt is likely in progress, performs a security action.

12. The system of claim 11, wherein the security action performed by the validation module comprises at least one of:
  notifying an administrator of the session hijacking attempt;
  notifying the user of the session hijacking attempt;
  requesting, from the user, at least one additional authentication factor; and
  denying authentication of the user for the authentication session.

13. The system of claim 8, wherein the validation module includes results of the analysis of the environmental context in the request for the indication from the user of whether the authentication session is valid.

14. The system of claim 8, wherein the input device comprises at least one of:
  a still image camera; and
  a video camera.

15. A non-transitory computer-readable medium comprising one or more computer-readable instructions that, when executed by at least one processor of a computing device, cause the computing device to:
  determine that a user is attempting to complete at least a portion of an authentication session on a first computing system;
  use input from at least one input device of the first computing system to obtain environmental context associated with the attempt by the user to complete the authentication session, the environmental context comprising at least one image of the user captured by a camera of the first computing system; and
  prevent the authentication session from authenticating the user while using the image of the user to determine whether the authentication session is valid, wherein using the image of the user to determine whether the authentication session is valid comprises:
  transmitting the image of the user to the user at a second computing system that comprises a mobile device of the user;
  the mobile device performing a computer-implemented analysis of the environmental context before requesting an indication that the authentication session is valid;
  the mobile device notifying the user that the environmental context is suspect by outputting a warning in response to determining that the image of the user shows a different person than a stored image of the user shows;
  requesting, from the mobile device of the user, the indication by the user of whether, based on an evaluation by the user of the image of the user, the authentication session is valid; and the mobile device notifying the first computing system that the user is allowed to be authenticated in the authentication session.

16. The non-transitory computer-readable medium of claim 15, wherein the one or more computer-readable instructions cause the computing device to request the indication from the user of whether the authentication session is valid by displaying an input request on the mobile device in possession of the user for the authentication session.

17. The non-transitory computer-readable medium of claim 15, wherein:
the indication from the user of whether the authentication session is valid indicates that the authentication session is valid; and
the one or more computer-readable instructions cause the computing device to allow the authentication session to authenticate the user.

18. The non-transitory computer-readable medium of claim 15, wherein:
an additional indication from the user of whether the authentication session is valid indicates that the authentication session is not valid; and
the one or more computer-readable instructions cause the computing device to:
determine, based on the additional indication from the user that the authentication session is not valid, that a session hijacking attempt is likely in progress; and
perform a security action.

19. The non-transitory computer-readable medium of claim 18, wherein the one or more computer-readable instructions cause the computing device to perform the security action, which comprises at least one of:
notifying an administrator of the session hijacking attempt;
notifying the of the session hijacking attempt;
requesting, from the user, at least one additional authentication factor; and
denying authentication of the user for the authentication session.

20. The non-transitory computer-readable medium of claim 15, wherein the one or more computer-readable instructions cause the computing device to
include results of the analysis of the environmental context in the request for the indication from the user of whether the authentication session is valid.

\* \* \* \* \*

UNITED STATES PATENT AND TRADEMARK OFFICE
CERTIFICATE OF CORRECTION

PATENT NO. : 10,148,631 B1
APPLICATION NO. : 14/869324
DATED : December 4, 2018
INVENTOR(S) : Ilya Sokolov et al.

Page 1 of 1

It is certified that error appears in the above-identified patent and that said Letters Patent is hereby corrected as shown below:

In the Claims

In Column 22, Line 12, Claim 19, delete "the of" and insert -- the user of --, therefor.

Signed and Sealed this
Fifth Day of February, 2019

Andrei Iancu
*Director of the United States Patent and Trademark Office*